(12) United States Patent
Jagannathan et al.

(10) Patent No.: US 8,502,170 B2
(45) Date of Patent: Aug. 6, 2013

(54) PATTERNED RADIATION-SENSING THERMOPLASTIC COMPOSITE PANELS

(75) Inventors: Seshadri Jagannathan, Rochester, NY (US); Chang-Ying Joseph Yang, Kelowna (CA); James R. Milch, Penfield, NY (US)

(73) Assignee: Carestream Health, Inc., Rochester, NY (US)

( * ) Notice: Subject to any disclaimer, the term of this patent is extended or adjusted under 35 U.S.C. 154(b) by 18 days.

(21) Appl. No.: 13/193,750

(22) Filed: Jul. 29, 2011

(65) Prior Publication Data

US 2013/0026392 A1    Jan. 31, 2013

(51) Int. Cl.
G01J 1/58    (2006.01)

(52) U.S. Cl.
USPC ..................................... 250/483.1

(58) Field of Classification Search
USPC ..................................... 250/483.1
See application file for complete search history.

(56) References Cited

U.S. PATENT DOCUMENTS

| 4,578,213 | A | * | 3/1986 | Simonetti | 252/301.17 |
| 4,713,198 | A | * | 12/1987 | Simonetti | 252/301.17 |
| 5,243,193 | A | * | 9/1993 | Suontausta et al. | 250/361 R |
| 5,606,638 | A | | 2/1997 | Tymianski et al. | |
| 5,914,072 | A | | 6/1999 | Zirnstein et al. | |
| 6,177,236 | B1 | | 1/2001 | Apte | |
| 6,744,052 | B1 | | 6/2004 | Petersson et al. | |
| 7,265,357 | B2 | | 9/2007 | Pham Gia et al. | |
| 7,304,309 | B2 | | 12/2007 | Suhami | |
| 7,521,685 | B2 | | 4/2009 | Hennessy et al. | |
| 7,608,837 | B2 | | 10/2009 | Roizin et al. | |
| 7,643,607 | B2 | | 1/2010 | Jiang et al. | |
| 7,652,261 | B1 | | 1/2010 | Wilson et al. | |
| 2002/0131547 | A1 | | 9/2002 | Riedner et al. | |
| 2004/0104500 | A1 | | 6/2004 | Bross et al. | |

FOREIGN PATENT DOCUMENTS

| WO | 2007/025485 | 3/2007 |
| WO | 2010/005977 | 1/2010 |

OTHER PUBLICATIONS

Ehsan Samei et al., "A method for measuring the presampled MTF of digital radiographic systems using an edge test device", Med. Phys. vol. 25 (1), Jan. 1998, 1998 Am. Assoc. Phys. Med., pp. 102-113.
Ehsan Samei et al., "Intercomparison of methods for image quality characterization" I. Modulation transfer function, Med. Phys. vol. 33 (5), May 2006, 1998 Am. Assoc. Phys. Med., pp. 1454-1465.
Ehsan Samei et al., "Comparison of edge analysis techniques for the determination of the MTF of digital radiographic systems", Phys. Med. Biol. vol. 50, 2005, pp. 3613-3625, Physics in Medicine and Biology.

(Continued)

*Primary Examiner* — Kiho Kim

(57) ABSTRACT

A patterned scintillator panel including an extruded scintillator layer comprising a thermoplastic polyolefin and a scintillator material, wherein the scintillator layer comprises a pattern. Also disclosed is a method of making a patterned scintillator panel including forming a scintillator layer by melt extrusion, the scintillator layer comprising thermoplastic particles comprising a thermoplastic polyolefin and a scintillator material; and patterning the scintillator layer. Further disclosed is a method of making a patterned scintillator panel including forming a scintillator layer by injection molding, the scintillator layer comprising thermoplastic particles comprising a thermoplastic polyolefin and a scintillator material; and patterning the scintillator layer.

20 Claims, 3 Drawing Sheets

OTHER PUBLICATIONS

Hiroshi Fujita et al., "A simple method for determining in modulation transfer function in digital Radiography", IEEE Transactions on Medical Imaging, vol. 11, No. 1, Mar. 1992.

I. A. Cunningham et al., "A method for modulation transfer function determination from edge profiles with correction for finite-element differentiation", Med. Phys. vol. 14, (4), Jul./Aug. 1987, 1987 Am. Assoc. Phys. Med, pp. 533-537.

International Search Report, International Application No. PCT/US2012/043423, Dated Dec. 10, 2012, 2 pages.

* cited by examiner

PATTERNED RADIATION-SENSING THERMOPLASTIC COMPOSITE PANELS

FIELD OF THE INVENTION

The invention relates generally to the field of patterned scintillator panels. More specifically, the invention relates to a patterned scintillator panel including an extruded scintillator layer comprising thermoplastic polyolefins and scintillator materials, and method for making the same.

BACKGROUND

Columnar, thallium-doped CsI scintillator screens have become the benchmark in digital radiography. Thallium-doped CsI screens provide an excellent combination of high scintillation efficiency and high x-ray absorptivity over wide energy ranges, while the columnar structure permits the screens to maintain a high spatial resolution at high x-ray stopping power. As a result, from an image quality perspective, columnar thallium-doped CsI screens have set the standard in most radiographic applications.

While columnar thallium-doped CsI screens have the potential to provide the highest spatial resolution needed for radiographic applications, achieving this potential has been difficult given the practical demands of radiography and the mechanical and environmental fragility of CsI-based materials. For example, CsI is highly water soluble and hygroscopic. Any scintillator panels made with CsI:Tl must be maintained in a sealed, low humidity environment to avoid attracting water that can negatively affect luminescence. CsI:Tl structures are also mechanically fragile, requiring special handling procedures during and after manufacture such as complete enclosure in shock resistant containers. As a result, production (and end product) costs are quite high in applications that have successfully realized the image quality benefit of thallium-doped CsI scintillator screens.

As a result, numerous attempts have been made over the past several decades to develop scintillator screens having a columnar structure using materials that would offer better mechanical and environmental stability. In order to create mechanically robust alternatives to columnar CsI scintillator screens, it is helpful to discuss the methods that could be used to fabricate a scintillator screen that satisfies the basic physics of total internal reflection. It is the concept of total internal reflection that enables columnar CsI scintillator screens to minimize the divergence of the optical radiation generated upon x-ray irradiation, and thus maximizes the spatial resolution of the screens. The various approaches that have been used to explore alternatives to columnar CsI screens thus far have been predominantly additive in nature (e.g., creating fibers containing scintillator materials and subsequently assembling the fibers into scintillator screens, creating microwells or microvoids, which are subsequently filled with a scintillator material)—of which the dominant approach has been the microwell technology. The fiber approach has not been particularly successful thus far, due to practical challenges in particle loading and fiber extrusion of particle-loaded material, while the microwell technology has faced a more fundamental challenge in establishing the conditions required for total internal reflection. Also, in the case of fibers, it has been found difficult to assemble the fibers into a bundle with a form factor that is useful for practical applications. In the case of the microwells, the process of filling of the microwells with the scintillator particles introduces air pockets, which results in regions of the microwells having a lower refractive index (than that of the walls of the microwells), and the conditions for total internal reflection are compromised in these regions. The concentration of these air pockets is non-uniform from microwell to microwell, which result in the deterioration in the optical performance of the scintillating screen. As a result, none of these approaches have successfully created a practically useful scintillator screen that approaches the image quality of columnar thallium-doped CsI scintillator screens.

While prior techniques may have achieved certain degrees of success in their particular applications, there is a need to provide, in a cost-friendly manner, patterned scintillator panels having not only image quality approaching that of CsI-based scintillator panels but also excellent mechanical and environmental robustness. The subtractive approach of patterning a continuous (non-patterned) scintillator screen as described in this disclosure overcomes the limitations of the additive methods used in previous approaches to creating a patterned scintillator screen.

SUMMARY

In an aspect, there is provided a patterned scintillator panel including an extruded scintillator layer comprising a thermoplastic polyolefin and a scintillator material, wherein the scintillator layer comprises a pattern.

In another aspect, there is disclosed a method of making a patterned scintillator panel including forming a scintillator layer by melt extrusion, the scintillator layer comprising thermoplastic particles comprising a thermoplastic polyolefin and a scintillator material; and patterning the scintillator layer.

In a further aspect, there is disclosed a method of making a patterned scintillator panel including forming a scintillator layer by injection molding, the scintillator layer comprising thermoplastic particles comprising a thermoplastic polyolefin and a scintillator material; and patterning the scintillator layer.

These aspects are given only by way of illustrative example, and such aspects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION

Figure 1A:
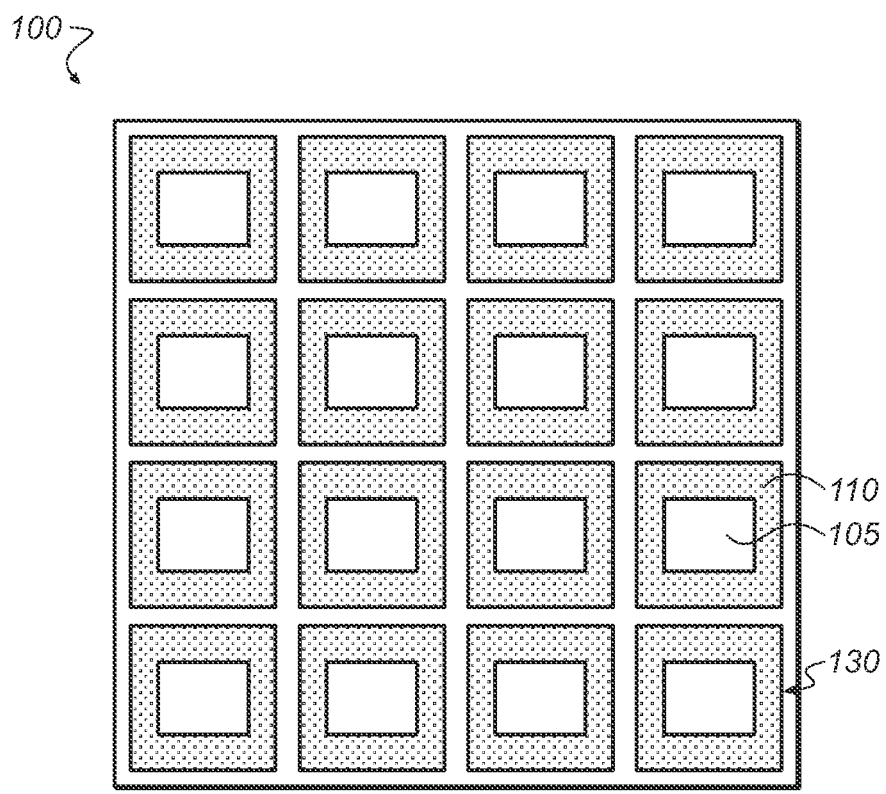
FIGS. 1A-1B depict an exemplary patterned scintillator panel and exemplary portion thereof in accordance with various embodiments of the present disclosure.

The following is a detailed description of the preferred embodiments of the invention, reference being made to the drawings in which the same reference numerals identify the same elements of structure in each of the several figures.

Exemplary embodiments herein provide patterned scintillator panels including an extruded scintillator layer with a thermoplastic polyolefin and a scintillator material, and methods of preparing thereof. In embodiments, scintillator layer has a pattern. As used herein, a "patterned" scintillator panel means having a recurring design ("pattern") on a surface of the panel. As used herein, "patterning" means forming a pattern on a surface of the scintillator panel.

Figure 1B:
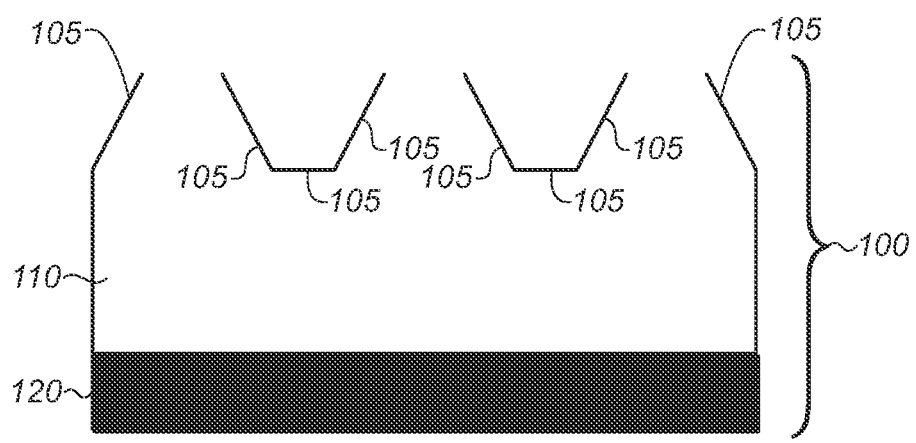

FIGS. 1A and 1B depict a top view and a side view, respectively, of an exemplary patterned scintillator panel 100 in accordance with various embodiments of the present disclosure. As used herein, "scintillator panel" is understood to have its ordinary meaning in the art unless otherwise specified, and refers to panels or screens that can generate visible light immediately upon exposure to X-radiation (also known as "prompt emission panels" or "intensifying screens"). As such, "panels" and "screens" are used interchangeably herein. It should be readily apparent to one of ordinary skill in the art that the patterned scintillator panel 100 depicted in FIGS. 1A and 1B represent a generalized schematic illustration and that other components can be added or existing components can be removed or modified. Patterned scintillator panels disclosed herein can take any convenient form provided they meet all of the usual requirements for use in computed or digital radiography. As illustrated in FIG. 1B, the patterned scintillator panel 100 may include a scintillator layer 110 having a pattern. The scintillator layer 110 may be extruded or injection molded.

The scintillator layer 110 can include a thermoplastic polyolefin and a scintillator material. The thermoplastic polyolefin may be polyethylene, a polypropylene, and combinations thereof. In an aspect, the polyethylene can be high density poly low density polyethylene (LDPE), medium density polyethylene (MDPE), linear low density polyethylene (LLDPE), very low density polyethylene (VLDPE), and the like. In a preferred embodiment, the thermoplastic polyolefin is low density polyethylene (LDPE). The thermoplastic polyolefin can be present in the scintillator layer in an amount ranging from about 1% to about 99% by volume, for example from about 10% to about 30% by volume, relative to the total volume of the scintillator layer 110.

The scintillator layer 110 can include a scintillator material. As used herein, "scintillator material" and "scintillator material" are used interchangeably and are understood to have the ordinary meaning as understood by those skilled in the art unless otherwise specified. "Scintillator material" can include inorganic materials capable of immediately emitting low-energy photons (e.g., optical photons) upon stimulation with and absorption of high-energy photons (e.g., X-rays). Materials that can be used in embodiments of the present disclosure include metal oxides, metal oxyhalides, metal oxysulfides, metal halides, and the like, and combinations thereof. In embodiments, the scintillator material can be a metal oxide, for example, $Y_2SiO_5:Ce$; $Y_2Si_2O_7:Ce$; $LuAlO_3:Ce$; $Lu_2SiO_5:Ce$; $Gd_2SiO_5:Ce$; $YAlO_3:Ce$; $ZnO:Ga$; $CdWO_4$; $LuPO_4:Ce$; $PbWO_4$; $Bi_4Ge_3O_{12}$; $CaWO_4$; $RE_3Al5O_{12}:Ce$, and combinations thereof, wherein RE is at least one rare earth metal. In another embodiment, the scintillator material can include one or more metal oxysulfides in addition to, or in place of, the metal oxides, such as $Gd_2O_2S$, $Gd_2O_2S:Tb$, $Gd_2O_2S:Pr$, and the like, and combinations thereof. In other embodiments, the scintillator material can include a metal oxyhalide, such as LaOX:Tb, wherein X is Cl, Br, or I. In further embodiments, the scintillator material 140 can be a metal halide having a general formula of $M(X)_n:Y$, wherein M is at least one of La, Na, K, Rb, Cs; each X is independently F, Cl, Br, or I; Y is at least one of Tl, Tb, Na, Ce, Pr, and Eu; and n is an integer between 1 and 4, inclusive. Such metal halides can include, for example, $LaCl_3:Ce$ and $LaBr_3:Ce$, among others. Other metal halide species that can be used in embodiments of the present disclosure include $RbGd_2F_7:Ce$, $CeF_3$, $BaF_2$, CsI(Na), $CaF_2:Eu$, LiI: Eu, CsI, CsF, CsI:Tl, NaI:Tl, and combinations thereof. Halide-like species, such as CdS:In, and ZnS can also be used in embodiments of the present disclosure. In exemplary embodiments, the scintillator material is a metal oxysulfide, such as $Gd_2O_2S$.

In embodiments, the scintillator material can be present in the extruded scintillator layer in an amount ranging from about 1% by volume to about 99% by volume, for example from about 30% by volume to about 70% by volume, relative to the volume of the extruded scintillator layer 110.

The thermoplastic polyolefin and the scintillator material are compounded together to form composite thermoplastic particles. The thermoplastic polyolefin and the scintillator material can be compounded in any amount by any known compounding process, for example by melt compounding. In this way, the composite thermoplastic particle can have scintillator material intercalated ("loaded") within the thermoplastic polyolefin.

In exemplary embodiments, the composite thermoplastic particles can be prepared by melt compounding the thermoplastic polyolefin with the scintillator material using a twin screw compounder. The ratio of thermoplastic polyolefin to scintillator material (polyolefin:scintillator) can range from about 10:90 to about 90:10, by volume, preferably from about 70:30 to about 30:70 by volume. During melt compounding, the thermoplastic polyolefin and the scintillator material can be compounded and heated through ten heating zones. For example, the first heating zone can have a temperature ranging from about 175° C. to about 180° C.; the second heating zone can have a temperature ranging from about 185° C. to about 190° C.; the third heating zone can have a temperature ranging from about 195° C. to about 200° C.; the fourth heating zone can have a temperature ranging from about 195° C. to about 200° C.; the fifth heating zone can have a temperature ranging from about 185° C. to about 190° C.; the sixth heating zone can have a temperature ranging from about 185° C. to about 190° C.; the seventh heating zone can have a temperature ranging from about 185° C. to about 190° C.; the eighth heating zone can have a temperature ranging from about 185° C. to about 190° C.; the ninth heating zone can have a temperature ranging from about 180° C. to about 175° C.; and the tenth heating zone can have a temperature ranging from about 175° C. to about 170° C. The period of time in each zone depends on the polymer used. Generally, the polymer can be heated for a time and temperature sufficient to melt the polymer and incorporate the scintillator material without decomposing the polymer. The period of time in each zone can range from about 0.1 minutes to about 30 minutes, for example from about 1 minute to about 10 minutes. Upon exiting the melt compounder, the composite thermoplastic material can enter a water bath to cool and harden into continuous strands. The strands can be pelletized and dried at about 40° C. The screw speed and feed rates for each of the thermoplastic polyolefin and the scintillator material can be adjusted as desired to control the amount of each in the composite thermoplastic particles.

The composite thermoplastic material can be extruded or injection molded to form the scintillator layer 110 by any extrusion or injection molding process known in the art. For example, the scintillator layer 110 can be formed as a sheet or film by extruding (e.g., melt extruding) or injection molding the pelleted composite thermoplastic material, or extruding (e.g., melt extruding) the pelleted composite thermoplastic material as fibers ("thermoplastic scintillator composite fibers"). The thickness of the scintillator layer 110 can range from about 10 μm to about 1000 μm, preferably from about 50 μm to about 750 μm, more preferably from about 100 μm to about 500 μm.

The scintillator layer 110 may include a pattern formed by any additive or subtractive patterning method known to those skilled in the art. Various known subtractive patterning methods are described in WO2007/025485 and WO2010/005977; and U.S. Pat. Nos. 6,744,052; 7,265,357; 7,608,837; 6,177,236; 7,521,685, the disclosures of which are incorporated herein by reference in their entirety. Subtractive patterning methods can include, but are not limited to, laser ablation, wet chemical and/or plasma chemical etching, isotropic gas phase processes, and the like. For example, as shown in FIGS. 1A-1B, if melt extruded or injection molded as a sheet or film, select regions of the scintillator layer 110 can be ablated by a laser according to a predetermined pattern (e.g., a pattern determined prior to ablation), creating scintillator pixels 130 that are separated by air, to form a patterned scintillator panel 100. As shown in FIGS. 1A and 1B, areas that have been ablated by a laser can form carbonized polyolefins 105. Even though subtractive patterning methods have been described and used in the semiconductor industry, there has been no successful demonstration of using any of these methods to create a patterned scintillator screen. The challenges in achieving appropriate particle loading and the ability to pattern a screen of sufficient thickness have not been demonstrated until now.

Alternatively, the pattern may be formed by any additive patterning method known in the art. Various known additive patterning methods are described in U.S. Pat. Nos. 7,643,607; 5,914,072; and 7,304,309, the disclosures of which are incorporated by reference herein in their entirety. For example, if extruded as thermoplastic scintillator composite fibers, the fibers can be arranged into a columnar array and cooled to form a patterned scintillator panel 100.

In yet another embodiment, the patterned scintillator panel 100 can include a scintillator layer 110 that is formed in a predetermined pattern—that is, the pattern is formed during formation, e.g., during injection molding, using a pre-patterned mold. In various embodiments, the patterned scintillator panel 100 may optionally include a support (not shown).

In an aspect, an opaque layer 120 can be extruded or injection molded, with the scintillator layer 110. For example, in an embodiment, the opaque layer 120 can comprise black dyes or carbon black and a suitable binder, such as polyethylene (e.g., LDPE). As shown in FIG. 1B, the opaque layer 120 can be extruded with the scintillator layer 110. The parameters of the extruder (e.g., screw speed and pump speed) or injection molding equipment can be adjusted to control the thickness for each of the scintillator layer 110 and the opaque layer 120, individually. The thickness of the scintillator layer 110 can range from about 10 μm to about 1000 μm, preferably from about 50 μm to about 750 μm, more preferably from about 100 μm to about 500 μm. The thickness of the opaque layer 120 can range from about 10 μm to about 1000 μm, preferably from about 50 μm to about 750 μm, more preferably from about 100 μm to about 500 μm.

In an aspect, the scintillator layer 110 and opaque layer 120 may be disposed (e.g., extruded or injection molded) onto a support (not shown). The thickness of the support can vary depending on the materials used so long as it is capable of supporting itself and layers disposed thereupon. The scintillator layer 110 can be disposed onto a side of a support opposite the opaque layer 120—in other words, the scintillator layer 110 and the opaque layer 120 can be disposed on opposite sides of a support. Alternatively, the scintillator layer 110 and the opaque layer 120 can be disposed on the same side of a support. Generally, a support can have a thickness ranging from about 10 μm to about 1,000 μm, for example from about 50 μm to about 750 μm, such as from about 100 μm to about 500 μm. The support 110 can have a smooth or rough surface, depending on the desired application. If a support having a black surface (e.g., carbon black) is included, an opaque layer 120 may not be needed. In an exemplary embodiment, the scintillator layer 110 is co-extruded with an opaque layer 120, without a support.

In an aspect, an anticurl layer (not shown) may be coextruded with the scintillator layer 110 to manage the dimensional stability of the scintillator screen, or extruded separately on either side of a support, if a support is used.

Optionally, the patterned scintillator panel 100 can include a protective overcoat (not shown) disposed over the patterned scintillator layer 110. The protective overcoat can comprise one or more polymer binders normally used for this purpose, such as cellulose ester (e.g., cellulose acetate) and other polymers that provide the desired mechanical strength and scratch and moisture resistance. However, inclusion of a protective layer on the patterned scintillator panel 100 can reduce spatial resolution.

Without being limited by theory, it is believed that forming the scintillator layer by extrusion or injection molding increases the homogeneity of the scintillator layer, increases optical transparency, and eliminates undesirable "evaporated space" (which can contribute to decreased spatial resolution) when a solvent is evaporated in solvent-coating methods (e.g., DRZ-Plus ("DRZ+") screens, available from MCI Optonix, LLC), thereby increasing the optical transparency of the scintillator layer 110 and spatial resolution of a scintillator panel comprising the disclosed scintillator layer 110. A patterned scintillator panel 100 according to the present disclosure can thus have excellent high-energy radiation absorption ("stopping power") and high conversion efficiency, as well as mechanical and environmental robustness.

Without being limited by theory, it is also believed that the disclosed approach to patterned scintillator panels overcomes a fundamental limitation of earlier Previous methods for making scintillator panels involved creating cavities (e.g., microwells or microvoids) in inorganic or polymeric materials and then filling the cavities with scintillator material and additives (organic, inorganic, or polymeric), which typically results in partial filling of the cavity with the scintillator material. Regardless of the method of filling and the presence or absence of any additives, the cavity will always have air voids, which would adversely affect total internal reflection and result in a scintillator panel with reduced image quality. While the cavity's interior can be coated with a metallic reflector to increase total internal reflection (i.e., reduce the negative effect caused by air voids in the cavity), such compensatory methods are less desirable than methods directed to avoiding and/or reducing air voids.

The disclosed patterned scintillator panels avoid all of these issues since no cavity filling is necessary. A patterned thermoplastic composite scintillator panel as disclosed herein can have columnar structures including a scintillator material (e.g., gadolinium oxysulfide with a refractive index $\leqq 1.3$) loaded into a thermoplastic polyolefin matrix (e.g., LDPE with a refractive index $\leqq 1.3$). Because the columnar structures are formed by extrusion or injection molding, little or no air voids are formed. The space between columnar structures is either air (refractive index=1) or any other material with a refractive index <1.3. Accordingly, the conditions for total internal reflection in scintillator panels are met.

In embodiments, a patterned scintillator panel 100 having the disclosed extruded scintillator layer 110 can have an intrinsic modulation transfer function ("intrinsic MTF" or "iMTF") at least 5% greater than the iH50 of a solvent-coated DRZ+ screen, for example about 5% to about 95% or about 50% to about 95% greater than the iH50 of a solvent-coated DRZ+ screen. As used herein, intrinsic MTF (also known as "universal MTF") is understood to have its ordinary meaning in the art unless otherwise specified, and can be derived from the modulation transfer function ("MTF"), as shown in the following formula: iMTF(v)=MTF(f*l), where f is the spatial frequency and L is the screen thickness. (v=f*l is therefore a dimensionless quantity.) As used herein, "iH50" is the value of v at which the iMTF=0.5. As used herein, the measure of improvement in iH50 is calculated with respect to the iH50 of a DRZ-Plus ("DRZ+") screen, available from MCI Optonix, LLC.

In computed or digital radiography, the MTF is dominantly decided by the scintillator panels used for X-ray absorption. Many well-established methods can be used for measuring MTF, all of which basically involve capturing the gray scale gradation transition in the X-ray image of an object that provides an abrupt change in X-ray signal from high to low. Exemplary methods of measuring MTF are described in A. Cunningham and A. Fenster, "A method for modulation transfer function determination from edge profiles with correction for finite element differentiation," Med. Phys. 14, 533-537 (1987); H. Fujita, D. Y. Tsai, T. Itoh, K. Doi, J. Morishita, K. Ueda, and A. Ohtsuka, "A simple method for determining the modulation transfer function in digital radiography," IEEE Trans. Med. Imaging 11, 34-39 (1992); E. Samei and M. J. Flynn, "A method for measuring the presampling MTF of digital radiographic systems using an edge test device," Med. Phys. 25, 102-113 (1998); E. Samei, E. Buhr, P Granfors, D Vandenbroucke and X Wang, "Comparison of edge analysis techniques for the determination of the MTF of digital radiographic systems," Physics in Medicine and Biology 50 (15) 3613 (2005); E Samei, N. T. Ranger, J. T. Dobbins, and Y. Chen, "Intercomparison of methods for image quality characterization. I. Modulation transfer function," Med. Phys. 33, 1454 (2006), the disclosures all of which are herein incorporated by reference in their entirety.

In an aspect, a method of making a patterned scintillator panel can include forming a scintillator layer 110 by melt extrusion, the scintillation layer including thermoplastic particles, which can include a thermoplastic polyolefin and a scintillator material; and patterning the scintillator layer. In another aspect, a method of making a patterned scintillator panel can include forming a scintillator layer 110 by injection molding, the scintillation layer including thermoplastic particles, which can include a thermoplastic polyolefin and a scintillator material; and patterning the scintillator layer. In both aspects, patterning the scintillator layer can include subtractive patterning or additive patterning techniques.

In an embodiment, a scintillator detection system can include the disclosed patterned scintillator panel 100 coupled to at least one photodetector. At least one photodetector can be configured to detect photons generated from the patterned scintillator panel 100. Non-limiting examples of at least one photodetector include photodiodes, photomultiplier tubes (PMT), CCD sensors (e.g., EMCCD), image intensifiers, and the like, and combinations thereof. Choice of a particular photodetector will depend, in part, on the type of scintillator panel being fabricated and the intended use of the ultimate device fabricated with the disclosed scintillator panel.

EXAMPLES

Composite Thermoplastic Particle Production

Composite thermoplastic particles according to the present disclosure were prepared comprising 80 wt. % gadolinium oxysulfide ($Gd_2O_2S$) ("GOS") and 20 wt. % low density polyethylene (LDPE 811A, available from Westlake Chemical Corp. of Houston, Tex.). The GOS powder was loaded into Feeder 2 and the LDPE was loaded into Feeder 4 of a Leistritz twin screw compounder. The die temperature was set to 200° C. and 10 heating zones within the compounder were set to the temperatures shown in Table 1 below:

TABLE 1

| | Zone | | | | | | | | | |
|---|---|---|---|---|---|---|---|---|---|---|
| | 1 | 2 | 3 | 4 | 5 | 6 | 7 | 8 | 9 | 10 |
| Temp (° C.) | 180 | 190 | 200 | 200 | 190 | 190 | 190 | 190 | 175 | 170 |

The screw speed was 300 RPM, and the GOS powder and LDPE were gravity fed into the screw compounder. After exiting the die, the composite thermoplastic particles, comprising LDPE loaded with $Gd_2O_2S$, entered a 25° C. water bath to cool and hardened into continuous strands. The strands were then pelletized in a pelletizer and dried at 40° C.

Co-Extrusion of Scintillator Layer and Opaque Layer

5% carbon black particles in LDPE were prepared by melt compounding carbon black masterbatch (Ampacet black MB-191029, available from Amapacet Corp. of Tarrytown, N.Y.) with LDPE (811A, available from Westlake Chemical Corp. of Houston, Tex.) in a Leistritz twin screw compounder under the same conditions used to produce the composite thermoplastic material. The carbon black masterbatch was loaded into Feeder 1 and the LDPE was loaded into Feeder 4 of the twin screw compounder. The screw speed was 300 RPM, and the carbon black and LDEP were gravity fed into the screw compounder. After exiting the die, the carbon black entered a 25° C. water bath to cool and hardened into continuous strands. The strands were then pelletized in a pelletizer and dried at 40° C.

For each of Inventive Examples 1 through 3, the pelletized composite thermoplastic materials were loaded into a single screw Killion extruder and the pelletized carbon black particles was loaded into a single screw Davis-Standard extruder. Within each extruder, heating zones were set to the temperatures shown in Tables 2A and 2B below:

TABLE 2A

| Davis-Standard Extruder | |
|---|---|
| Zone | Temp |
| 1 | 350° F. |
| 2 | 380° F. |
| 3 | 400° F. |
| Exit flange | 400° F. |
| Poly line 1 | 400° F. |
| Poly line 2 | 400° F. |
| Melt pump | 400° F. |

TABLE 2B

Killion Extruder

| Zone | Temp |
|---|---|
| 1 | 350° F. |
| 2 | 380° F. |
| 3 | 400° F. |
| 4 | 400° F. |
| Gate | 400° F. |
| Adapter | 400° F. |
| Poly line | 400° F. |
| Melt pump | 400 ° F. |

Both types of pelletized materials (composite thermoplastic and carbon black) were co-extruded through a single die with the die temperature set at 400° F. form a transparent scintillator panel (Inventive Panels 1 and 2). The pelletized composite thermoplastic material formed a transparent scintillator layer, and the pelletized carbon black formed a carbon black layer underneath the transparent scintillator layer. For each of Inventive Panels 1 and 2, the screw speed, feed rates, and layer thicknesses are described in Table 3 below.

TABLE 3

| | Screw Speed (RPM) | Feed Rate | Scintillator layer thickness (micron) | Carbon Black layer thickness (micron) |
|---|---|---|---|---|
| Inventive Panel 1 | 300 | gravity | 452 | 500 |
| Inventive Panel 2 | 300 | gravity | 452 | 500 |

Inventive Panel 1 was not patterned ("Unpatterned Panel 1"). A predetermined pattern was laser ablated onto Inventive Panel 2 ("Patterned Panel 2").

The characteristics of Inventive Panels 1 and 2 described above and three types of scintillator panels known in the art are described in Table 4 below:

TABLE 4

| Panel Type | Crystal | Method | Scintillator layer thickness (microns) | X-ray Absorption | Packing Density |
|---|---|---|---|---|---|
| DRZ+ | Powder | Solvent-coated | 208 | 0.54 | 0.64 |
| MIN-R EV | Powder | Solvent-coated | 90 | 0.24 | 0.5 |
| CsI | Needle | Vapor deposition | 600 | 0.88 | 0.75 |
| Unpatterned Panel 1 | Powder | Extrusion | 452 | 0.58 | 0.32 |
| Patterned Panel 2 | Powder | Extrusion | 452 | 0.58 | 0.32 |

Figure 2:
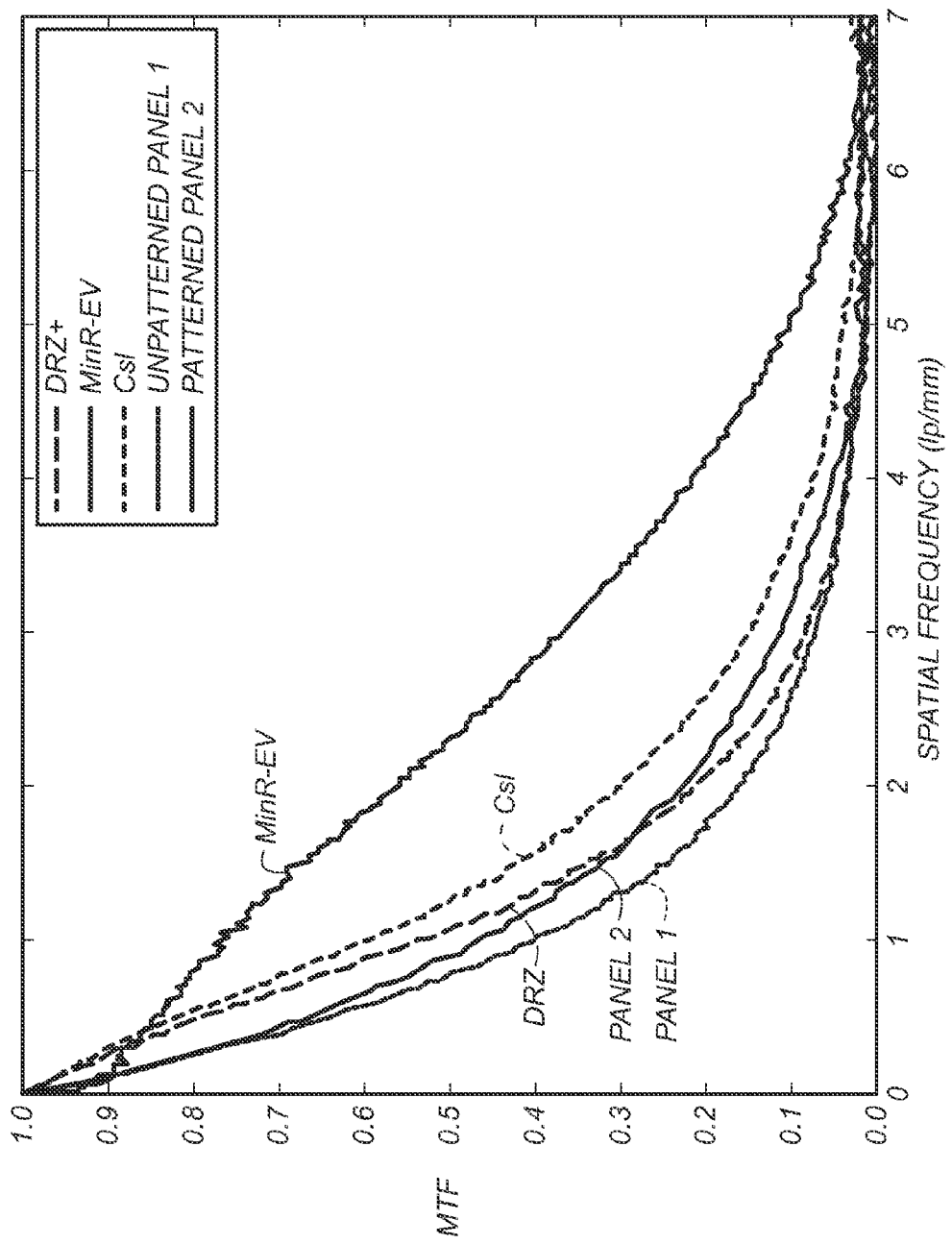
FIG. 2 compares the MTF performance of a patterned scintillator panel in accordance with various embodiments of the present disclosure versus comparative scintillator panels in the art.
Figure 3:
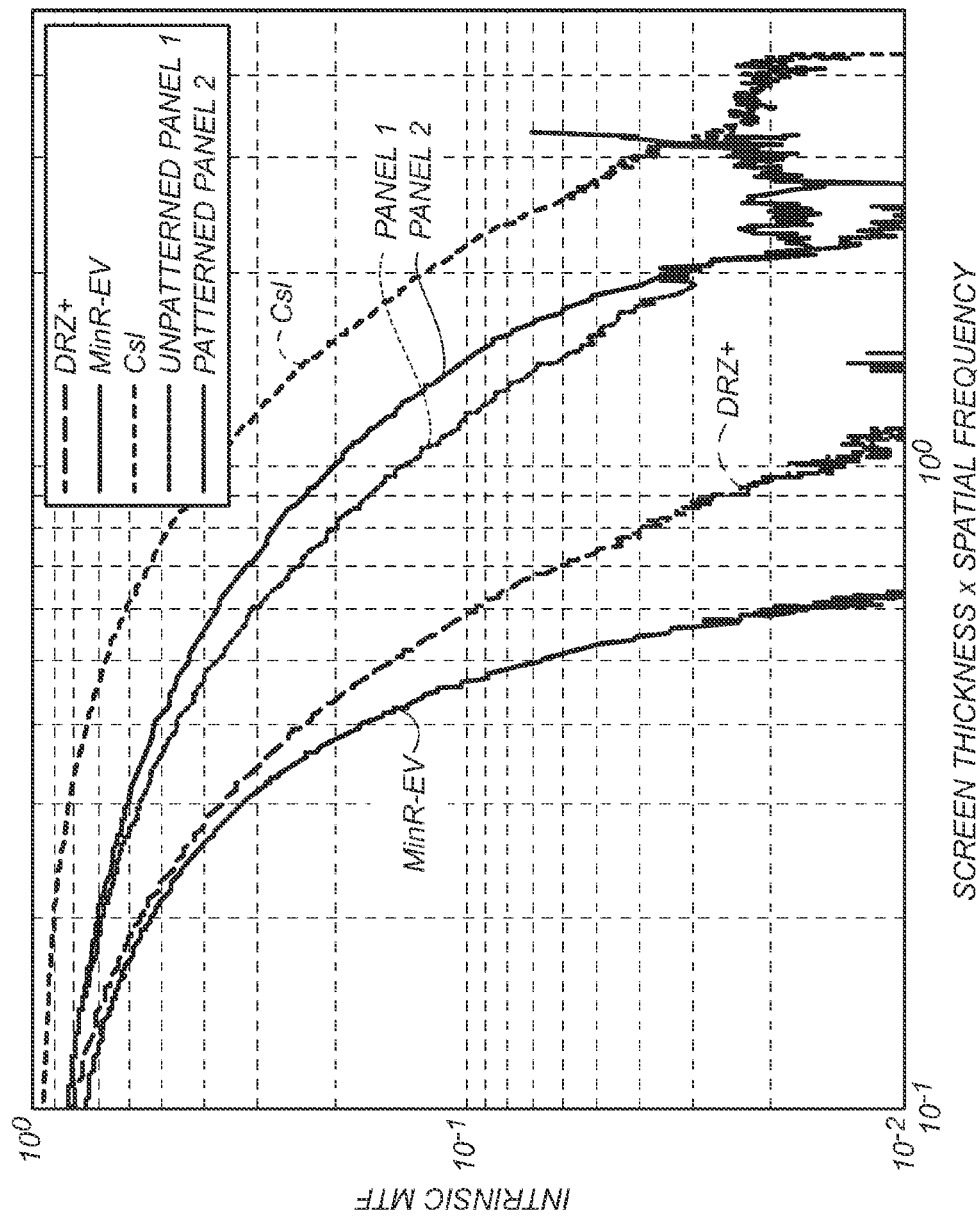
FIG. 3 compares the intrinsic MTF performance of a patterned scintillator panel in accordance with various embodiments of the present disclosure versus comparative scintillator panels in the art.

The MTFs of all of the panels in Table 4 were measured using MTF methods described above. Results are shown in FIG. 2. The intrinsic MTFs of all the panels in Table 4 were calculated from the measured MTF using the equation iMTF(v)=MTF (f*l), as shown in FIG. 3. The iH50 (value of v at which iMTF=0.5) was also calculated for each of the panels in Table 4, using the same equation above, as described in Table 5 below:

TABLE 5

| Panel Type | iH50 |
|---|---|
| DRZ+ | 0 |
| MinR-EV | −0.045 |
| CsI | 2.45 |
| Unpatterned Panel 1 | 0.63 |
| Patterned Panel 2 | 0.86 |

As illustrated in FIGS. 2 and 3, a large gap exists between the MTF and iMTF performance of solvent-coated panels (DRZ+, available from MCI Optonix, LLC, and Kodak MIN-R EV, available from Carestream Health) versus CsI panels; however, the MTFs and iMTFs of the disclosed extruded patterned panels are superior to the solvent-coated panels and approach the iH50 of CsI panels.

Without being limited by theory, it is believed that forming the scintillator layer 110 by extrusion or injection molding increases the homogeneity of the scintillator layer and eliminates undesirable "evaporated space" (which can contribute to decreased spatial resolution) when a solvent is evaporated in solvent-coating methods, thereby increasing the transparency of the scintillator layer 110 and spatial resolution of a scintillator panel comprising the disclosed scintillator layer 110.

Without being limited by theory, it is also believed that the disclosed extruded scintillator panels have reduced refractive index mismatching as compared to solvent-coated panels (i.e., when the materials comprising the scintillator layer have disparate refractive indices, the amount of optical photons scattered is relatively large; the more disparate the refractive indices, the more light is scattered, the lower the image resolution), and therefore display increased transparency and improved spatial resolution as compared to solvent-coated panels.

Additionally, it is further believed, without being limited by theory, that patterning the extruded or injection molded scintillator layers can provide a scintillator panel having columnar scintillator structures without air voids, thereby resulting in panels with increased total internal reflection and iH50 values superior to solvent-coated screens and approaching the CsI benchmark.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A patterned scintillator panel comprising:
   an extruded scintillator layer comprising a thermoplastic polyolefin and a scintillator material, where at least a portion of one surface of the scintillator layer is patterned.

2. The patterned scintillator panel of claim 1, wherein the pattern is subtractively patterned or additively patterned.

3. The patterned scintillator panel of claim 1, wherein the patterned scintillator panel has an intrinsic MTF of about 5% to about 95% greater than the iH50 of a solvent-coated non-patterned screen.

4. The patterned scintillator panel of claim 1, wherein the thermoplastic olefin comprises low density polyethylene.

5. The patterned scintillator panel of claim 1, wherein the scintillator material comprises at least one phosphor selected from the group consisting of $Y_2SiO_5$:Ce; $Y_2Si_2O_7$:Ce; $LuAlO_3$:Ce; $Lu_2SiO_5$:Ce; $Gd_2SiO_5$:Ce; $YAlO_3$:Ce; ZnO:Ga; $CdWO_4$; $LuPO_4$:Ce; $PbWO_4$; $Bi_4Ge_3O_{12}$; $CaWO_4$; $GdO_2S$: Tb, $GdO_2S$:Pr; $RE_3Al5O_{12}$: Ce, and combinations thereof, wherein RE is at least one rare earth metal, wherein the ratio of thermoplastic polyolefin to scintillator material ranges from about 10:90 to about 90:10.

6. The patterned scintillator panel of claim 1, where the thermoplastic polyolefin is a non-scintillating material.

7. The patterned scintillator panel of claim 1, further comprising a co-extruded opaque layer comprising carbon black.

8. The patterned scintillator panel of claim 1, wherein the extruded scintillator layer comprises a thickness ranging from about 10 μm to about 1000 μm.

9. A method of making a patterned scintillator panel comprising:
forming a scintillator layer by melt extrusion, the scintillator layer comprising a thermoplastic polyolefin and a scintillator material; and
patterning the scintillator layer.

10. The method of claim 9, wherein patterning the scintillator layer comprises subtractive patterning or additive patterning at least a portion of one surface of the scintillator layer.

11. The method of claim 9, wherein the thermoplastic particles are formed by melt compounding the thermoplastic polyolefin and scintillator material through ten heating zones for a period of time in each zone, the first heating zone comprising a temperature ranging from about 175° C. to about 180° C.; the second heating zone comprising a temperature ranging from about 185° C. to about 190° C.; the third heating zone comprising a temperature ranging from about 195° C. to about 200° C.; the fourth heating zone comprising a temperature ranging from about 195° C. to about 200° C.; the fifth heating zone comprising a temperature ranging from about 185° C. to about 190° C.; the sixth heating zone comprising a temperature ranging from about 185° C. to about 190° C.; the seventh heating zone comprising a temperature ranging from about 185° C. to about 190° C.; the eighth heating zone comprising a temperature ranging from about 185° C. to about 190° C.; the ninth heating zone comprising a temperature ranging from about 180° C. to about 175° C.; and the tenth heating zone comprising a temperature ranging from about 175° C. to about 170° C., wherein the period of time in each zone ranges from about 0.01 min to about 30 min.

12. The method of claim 11, where the extruded scintillator layer comprises a thickness ranging from about 10 μm to about 1000 μm.

13. The method of claim 9, further comprising co-extruding an opaque layer with the extruded scintillator layer.

14. The method of claim 9, wherein the ratio of thermoplastic polyolefin to scintillator material ranges from about 10:90 to about 90:10.

15. A method of making a patterned scintillator panel comprising:
forming a scintillator layer by injection molding, the scintillator layer comprising thermoplastic particles comprising a thermoplastic polyolefin and a scintillator material; and
patterning the scintillator layer.

16. The method of claim 15, wherein patterning the scintillator layer comprises subtractive patterning or additive patterning at least a portion of one surface of the scintillator layer.

17. The method of claim 15, wherein the thermoplastic particles are formed by melt compounding the thermoplastic polyolefin and scintillator material through ten heating zones for a period of time in each zone, the first heating zone comprising a temperature ranging from about 175° C. to about 180° C.; the second heating zone comprising a temperature ranging from about 185° C. to about 190° C.; the third heating zone comprising a temperature ranging from about 195° C. to about 200° C.; the fourth heating zone comprising a temperature ranging from about 195° C. to about 200° C.; the fifth heating zone comprising a temperature ranging from about 185° C. to about 190° C.; the sixth heating zone comprising a temperature ranging from about 185° C. to about 190° C.; the seventh heating zone comprising a temperature ranging from about 185° C. to about 190° C.; the eighth heating zone comprising a temperature ranging from about 185° C. to about 190° C.; the ninth heating zone comprising a temperature ranging from about 180° C. to about 175° C.; and the tenth heating zone comprising a temperature ranging from about 175° C. to about 170° C., wherein the period of time in each zone ranges from about 0.01 min to about 30 min.

18. The method of claim 15, where the extruded scintillator layer comprises a thickness ranging from about 10 μm to about 1000 μm.

19. The method of claim 15, further comprising co-extruding an opaque layer with the extruded scintillator layer.

20. The method of claim 15, wherein the ratio of thermoplastic polyolefin to scintillator material ranges from about 10:90 to about 90:10.

* * * * *